Jan. 8, 1957   F. G. BURG   2,776,584
FEED CONTROL SYSTEM FOR MACHINE TOOLS
Filed May 11, 1953   4 Sheets-Sheet 1
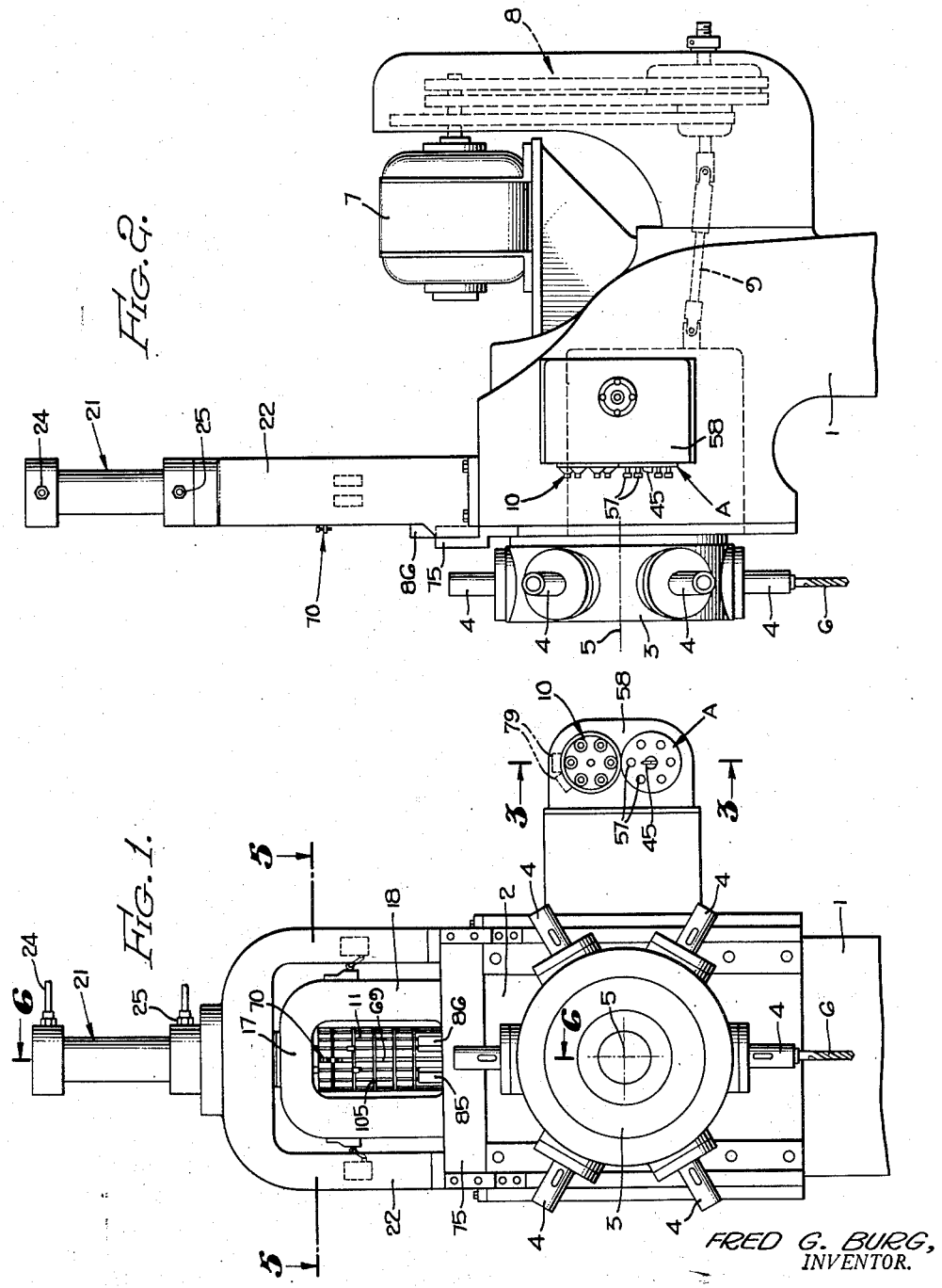
FRED G. BURG,
INVENTOR.
BY John Flann
ATTORNEY

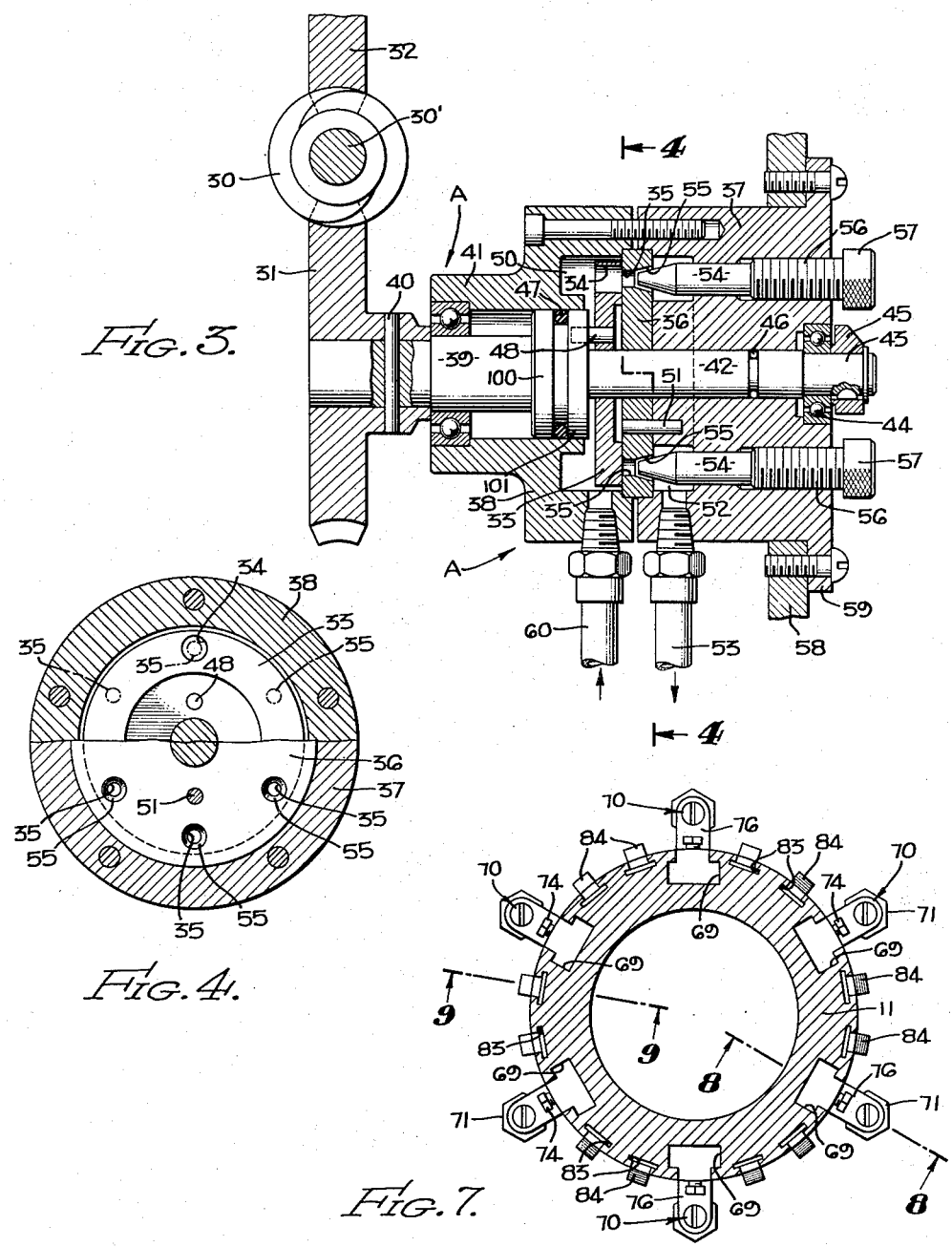

Jan. 8, 1957     F. G. BURG     2,776,584

FEED CONTROL SYSTEM FOR MACHINE TOOLS

Filed May 11, 1953     4 Sheets-Sheet 3

FRED G. BURG,
INVENTOR.

BY John Flam
ATTORNEY

United States Patent Office 2,776,584
Patented Jan. 8, 1957

2,776,584

FEED CONTROL SYSTEM FOR MACHINE TOOLS

Fred G. Burg, Los Angeles, Calif.

Application May 11, 1953, Serial No. 354,349

4 Claims. (Cl. 77—25)

This invention relates to machine tools, and particularly to the type of tool described in the following pending applications in the name of Fred G. Burg:

Serial 32,198, filed January 10, 1948, now Patent No. 2,670,636, Machine Tool of the Drill Press Type, etc.; Serial 276,622, filed March 14, 1952, Cyclically Operable Transmission Mechanism; Serial 276,755, filed March 15, 1952, Speed Control System for Machine Tools.

In such apparatus, an angularly adjustable tool head is provided for successively bringing a number of tools in operative relation to the work. For each angular adjustment, a rotary tool, such as a drill, reamer, tap or the like, is placed so that its axis of rotation corresponds to the direction of feed of the tool toward the work.

In the prior filed applications, the head is advanced and retracted from the work by a manually operated rack and pinion mechanism.

It is one of the objects of this invention to make it possible to feed the tool by an inexpensive power mechanism, such as by the aid of hydraulic pressure.

In operations adapted to be performed by the machine tool of this character, the rate of feed of the successive tool is not uniform. For example, a reamer can be fed faster than a drill; and similarly, a drill of larger diameter must be fed at a slower rate than a smaller drill.

It is accordingly another object of this invention independently to determine the rate of feed adjustable in a continuous manner for each tool as it is placed in active position.

It is still another object of this invention to make it possible to feed or retract the tool at a fast or maximum rate at all times when the tool is not engaging the work. In this way, the controlled feed is effective only when needed.

This invention possesses many other advantages, and has other objects which may be made more clearly apparent from a consideration of one embodiment of the invention. For this purpose, there is shown a form in the drawings accompanying and forming part of the present specification. The form will now be described in detail, illustrating the general principles of the invention; but it is to be understood that this detailed description is not to be taken in a limiting sense, since the scope of this invention is best defined by the appended claims.

Referring to the drawings:

Figure 1 is a fragmentary front elevation of a machine tool in which the invention is embodied;

Fig. 2 is a fragmentary side elevation thereof;

Fig. 3 is an enlarged sectional view taken along a plane corresponding to line 3—3 of Fig. 1;

Fig. 4 is a sectional view taken along a plane corresponding to line 4—4 of Fig. 3;

Fig. 7 is a sectional view taken along a plane corresponding to line 7—7 of Fig. 6.

Figure 8:
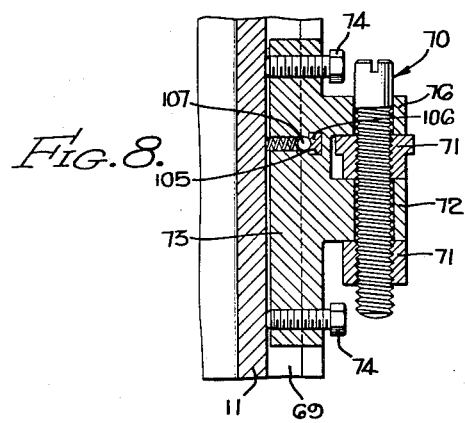
Figure 9:
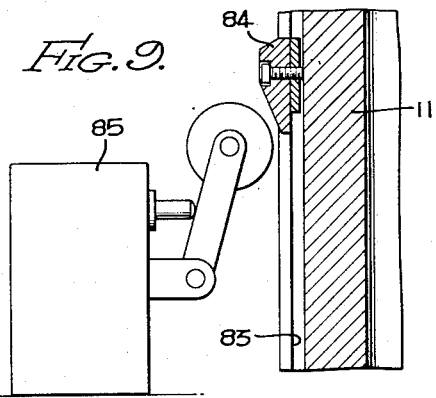
Figure 10:
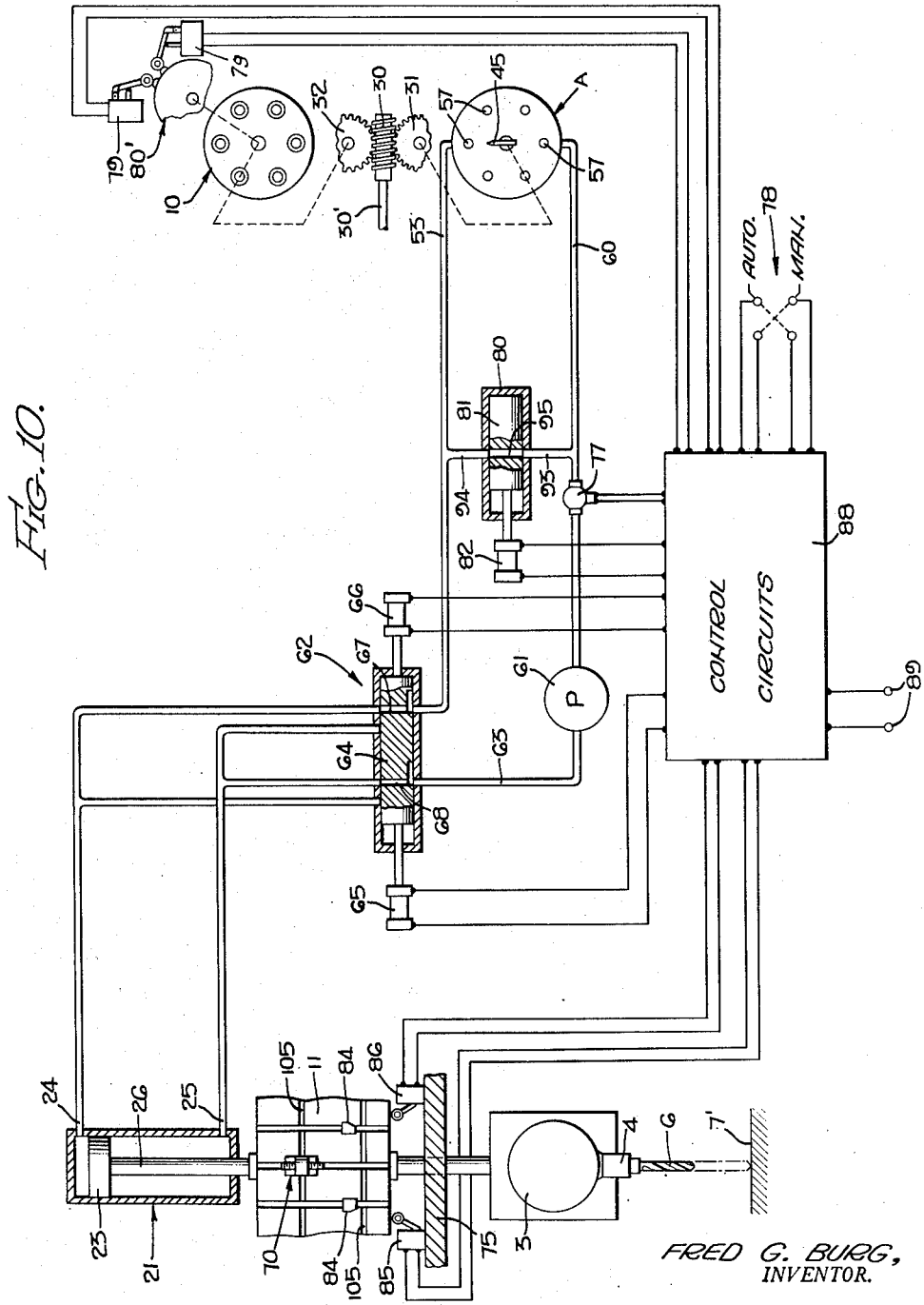

Figs. 8 and 9 are enlarged sectional views taken along planes corresponding to line 8—8 and 9—9 of Fig. 7; and Fig.10 is a view digrammatically illustrating the entire feed control system.

As shown most clearly in Figs. 1 and 2, the machine tool includes a standard 1 supporting a vertically movable slide 2. The standard 1 is arranged with appropriate guides for the edges of this slide. Slide 2 carries the tool holder 3 (Figs. 1 and 2). This tool holder head is provided with a plurality of equiangularly spaced tool chucks 4, six being shown in this instance. The axes of rotation of these chucks 4 are radial to the horizontal axis 5 about which the tool holder head 3 may be angularly adjustable. The manner in which this angular adjustment is accomplished is described in the said prior filed applications.

In the present instance a drill 6 is shown as being in operative relation to the work 7' (Fig. 10). This drill 6 may be driven by the aid of a conventional source of power, such as an electric motor 7 (Fig. 2). This motor is connected as by an appropriate transmission mechanism 8 and power output shaft 9 to the chuck 4 which holds the shank of drill 6.

In accordance with the disclosures of the said prior applications, the tool holder 3 may be advanced toward the work and then manually retracted to an upper limiting position. When this is accomplished automatic mechanism is operated throughout a cycle for adjusting the head 3 through an angle corresponding to the angular spacing of chucks 4. Automatic means, such as the speed control unit 10 (Figs. 1, 2 and 10) may be arranged as disclosed in application Serial No. 276,755 for causing the active tool to be rotated at the proper speed.

In these prior applications it had been assumed that the movement of the slide 2 toward and from the work be accomplished manually. In the present instance a liquid pressure system, such as a hydraulic cylinder and piston mechanism is used for that purpose.

Figure 5:
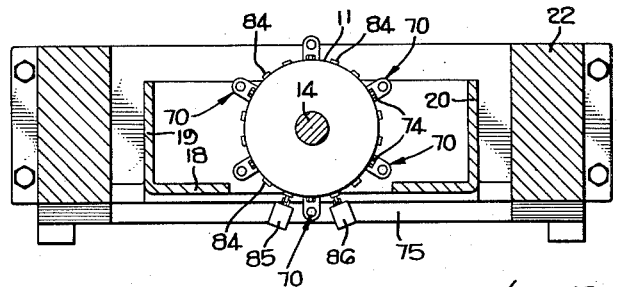
Fig. 5 is a sectional view taken along a plane corresponding to line 5—5 of Fig. 1.
Figure 6:
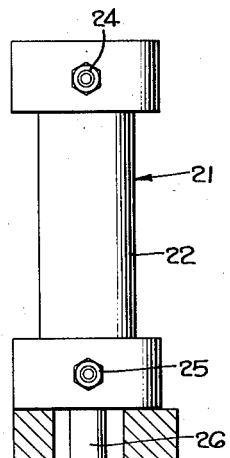
Fig. 6 is a longitudinal sectional view taken along a plane corresponding to line 6—6 of Fig. 1.

Thus, as shown most clearly in Figs. 1 and 6, the upper end of the slide 2 is connected to the lower end of a control drum structure 11. This may be accomplished by the aid of the thrust bearing structure 12 supported in the upper horizontal flange 13 of slide 2. The upper end of this drum structure is provided with a stub shaft 14 rotatably supported in the thrust bearing structure 15. This thrust bearing structure 15 is supported in the horizontal flange 16 of bracket 17. This bracket 17 is appropriately attached to the lower surface of a yoke 18. The yoke 18 (Fig. 5) is provided with the stiffening flanges 19, 20.

For moving the drum structure 11 vertically, and thereby the slide 2, use is made of a hydraulic mechanism 21 mounted on top of the stationary supplemental frame 22, disposed above main frame 1. This mechanism 21 includes a cylinder 22 within which operates a piston 23 (Fig. 10). Oil under pressure may be applied to either the upper conduit 24 or lower conduit 25.

For example, if liquid under pressure is supplied through the conduit 24 the piston stem 26 would be urged downwardly, and the slide 2 would move correspondingly so that ultimately the drill 6 would engage the work 7'. For this condition the conduit 25 operates as a return conduit passing oil to the intake side of a pump that provides the fluid pressure.

Obviously, if it is desired to raise the slide 2, the conduit 25 is connected to the pump outlet and the conduit 24 to the pump inlet.

The rate of feed either downwardly or upwardly is dependent upon the rate at which oil is supplied to the cylinder 22 through the conduit 24 or conduit 25.

This rate is predetermined by an appropriate feed control mechanism A illustrated in Figs. 3 and 4. This feed control mechanism is so arranged that for each angular position of the tool holder head 3, independent feed control for that position can be secured, as by angular adjustment of a shaft 39, corresponding to the angular adjustment of head 3. Accordingly, for each position of head 3, there is a corresponding angular position of shaft 39.

The manner in which the rate of oil flow to the cylinder 21 is controlled by mechanism A for each position of the head 3 may now be described.

A worm 30 (Fig. 3) is shown as driving worm wheels 31 and 32. Worm wheel 32 is connected to the speed controller mechanism 10 (Fig. 1) for determining the rate of rotation of the tool in the active chuck 4. The wheel 31 cooperates with the mechanism A that determines for each position of the head 3 the rate of flow of liquid to the cylinder 21.

For this purpose the worm 30 is coupled as by its shaft 30' to the mechanism that rotates the head 3 through an incremental angle. Accordingly, by the aid of worm 30, the worm wheel 31 is advanced through an angle of 60° when the head 3 is adjusted through this angle. Worm wheel 31 is coupled to a valve plate 33 rotatable about the axis of the wheel 31. This valve plate has a single port 34 adapted to cooperate with any one of six equiangularly spaced ports 35, in a stationary plate 36. For each angular portion of the head 3, the port 34 aligns with one of the ports 35. The remaining ports are all closed.

Oil under pressure can pass to the conduit 24, 25 only through the port 34 by way of a path hereinafter to be traced.

The valve structure A includes body 37 and a cover 38. Between these two elements is clamped the ported plate 36.

The wheel 31 is coupled to the shaft 39 as by a pin 40. This shaft is journalled in the hub 41 formed integrally with the cover member 38. The shaft 39 has a reduced extension 42 and an end extension 43. This end extension 43 serves to support the inner race of a ball bearing structure 44, mounted in body 37. This extension 43 carries a pointer 45 indicating the specific angular adjusted position of the shaft 39.

Sealing O-rings 46 and 47 are provided on the shaft 39. The latter ring 47 is accommodated between the two spaced flanges 100, 101 on shaft 39.

The shaft 39 is coupled to the valve plate 33 by the aid of a pin 48 fastened into flange 101, and which has an axis spaced from the axis of wheel 31.

Liquid or other fluid such as oil at high pressure is supplied to a chamber 50 formed by the aid of the cover member 38 and the plate 36. The pressure of this liquid serves to hold the plate 33 against the corresponding surface of the plate 36 in a fluid-tight manner. If necessary the cooperating surfaces may be appropriately ground or lapped.

Ported stationary plate 36 is restrained against angular movement not only by the clamping between body 37 and cover 38, but also by the aid of a pin 51.

Each of the ports 35 leads to an annular chamber 52, formed by the aid of the plate 36 and the body 37. An outlet conduit 53 is in fluid communication with this annular chamber 52.

In order to regulate the rate in a continuous manner at which liquid can flow from the chamber 50 to chamber 52, use is made of adjustable needle valve closures 54. There are six such closures, cooperating respectively with the port 35. These ports 35 each are provided with the diverging conical portion 55 cooperating with the conical end of the needle valve members 54. Each of the needle valve members 54 is provided with a threaded portion 56 adjustably threaded into the body member 37 and manipulable as by the aid of knurled heads 57.

Obviously, by appropriate adjustment of the stems 54, the rate of fluid flow for each position of the head 3 is determined, in a stepless manner.

The body 37 is supported upon the casing 58 of the mechanism as by the aid of the flange 59.

The valve mechanism A is compact and readily sealable as by seals 46 and 47. There is accordingly no danger of any material leakage, even if air instead of oil be used in the system.

In Fig. 10, the valve structure A just described, is shown as having the inlet conduit 60 and the outlet conduit 53. The inlet conduit 60 is coupled to the outlet of a pump 61. The outlet conduit 53 is arranged to be connected either to conduit 24 or 25 through a piston valve structure 62 which will be described in greater detail hereinafter. When conduit 24 is supplied with liquid under pressure from conduit 53, then conduit 25 is connected to the inlet side of the pump 61 by the aid of a conduit 63.

On the contrary, when the outlet conduit 53 is connected to conduit 25 for raising the head 3, the conduit 24 is connected to the inlet conduit 63 of pump 61.

The control valve 62 for this purpose is provided with a longitudinally movable slide valve 64. This slide valve can be moved in either direction by selective energization of the solenoids 65 and 66. When solenoid 66 is energized, as indicated in Fig. 10, the pump outlet is connected to conduit 24 by way of the port 67, conduit 53, and control valve A.

The conduit 25 is connected to the inlet conduit 63 of pump 61 by the aid of the port 68 in slide 64.

The reverse action occurs when the solenoid 65 is energized and solenoid 66 is deenergized. Under such circumstances the port 67 communicates with the conduit 25 and port 68 communicates with conduit 24.

Operation of electromagnets 65 and 66 is dependent upon the arrival of the tool 6 to its lowermost operative position with respect to the work 7. When this happens the pressure in the output side of the pump 61 is caused to increase because the downward travel of the tool 6 is stopped.

The control drum 11 supports various control elements for the system.

It is angularly adjusted simultaneously with the angular adjustment of the head 3, and its position corresponds to the position of head 3.

Thus, as shown in Fig. 6, the drum 11 carries at its lower end below the bearing structure 12, a bevel gear 27, which is adapted to be driven by a bevel pinion 28. This bevel pinion is in turn rotatably supported on the slide 2. The pinion is driven by the aid of a sprocket wheel and chain 29. This chain is driven by a sprocket wheel that is carried by head 3. Accordingly, for each angular position of the head 3 about its axis 5, there is a corresponding angular position of the control drum 11.

For example, when the head 3 is provided with six equiangularly spaced chucks 4, the drum 11 is provided with eighteen longitudinally extending T-slots arranged in sets of three. For the setting illustrated in Fig. 5, there is a relatively large T-slot 69 (Figs. 6, 7 and 8) in which is adjustably mounted an abutment member 70 in the form of a stud. Six such T-slots 69 are provided corresponding to the six angular positions of the drum 11.

Annular grooves 105 (Figs. 1, 6 and 9) around drum 11 intersect the T-slots 69 and are spaced uniformly. A slide 73 is accommodated in each of the slots 69. This slide carries the abutment member 70.

For coarse adjustment of the slide 73 in slot 69, a key 106 (Fig. 8) projects horizontally through the slide, and engages in any one of the grooves 105. By withdrawing the key against the frictional force of a spring-pressed ball 107, the slide 73 can be adjusted by increments corresponding to the spacing of grooves 105. After adjustment, the key 106 may be reinserted.

A supplemental fine adjustment is provided by the aid of nuts 71 engaging threads on member 70, on opposite sides of an intermediate lug 72. An upper lug or boss 76 serves as a further guide for the abutment member 70. After complete adjustment, slide 73 is held tightly within the T-slot 69 by the aid of the screws 74.

The bottom surface of the active abutment 70 (for a particular setting of head 3) is intended to engage the upper surface of a horizontal member 75 (Fig. 5) attached to a stationary part of the standard 22. This member 75 extends across the front of the apparatus, as indicated most clearly in Fig. 1.

Upon downward travel of the drum structure 11 and the slide 2, the lower end of the abutment 70 ultimately contacts the upper surface of the member 75. The other abutment members 70 are displaced angularly from the active one, and come into active position successively as the head 3 and drum structure 11 are simultaneously angularly adjusted. Since the pump 61 continues to operate, even after the abutment reaches its limiting position, the pressure switch 77 (Fig. 10) connected to the outlet side of pump 61 builds up a sufficient pressure to close or open the pressure switch located in a control circuit. This control circuit in turn serves to cause the solenoid 65 to be energized and the solenoid 66 to be deenergized. This causes the conduit 25 to be connected to the outlet side of the pump 61 and the conduit 24 to the inlet side of the pump 61. Accordingly, the slide 2, with the associated drum parts 11, is raised by liquid pressure and is urged to the uppermost position indicated in Fig. 6.

As explained in the prior applications hereinabove referred to, the arrival of the mechanism near its uppermost position causes automatic angular adjustment of the head 3. It also causes automatic adjustment of the shaft 39 (Fig. 3) so as to place the port 34 into communication with the next succeeding port 35. Since the slide 2 is urged upwardly against a yielding stop, as described in said prior applications, there is no substantial increase in liquid pressure to operate the switch 77.

After shaft 39 is adjusted, the mechanism may again be started by hand as by the aid of the switch 78 (Fig. 10) or else the switch may be turned to automatic operation. In such case the solenoid 66 is caused to be energized and solenoid 65 to be deenergized. This is accomplished by the aid of micro-switches 79 adapted to be operated by cam structure 80' mounted upon or driven by the shaft 30' which carries the worm 30.

As soon as this occurs, the head 3 and slide 2 are moved downwardly, and the cycle is repeated as before.

Provisions are made to cause the travel of the head toward the work to be quite rapid, until the rotary tool 6 approaches closely to the work 7. At this point the rate of feed is slowed down to correspond to the setting of the valve structure A.

Conversely, upon the rising of the head 3 to a point where the tool 6 just clears the work, the further upward travel is accelerated.

For this purpose, use is made of a by-pass valve structure which is shunted across the valve A. This by-pass valve structure, as shown most clearly in Fig. 10, includes a cylinder 80 and a slide 81 operated by solenoid 82. In the unenergized position of Fig. 10, a by-pass is established through conduits 93 and 94 and port 95 of slide 81. Accordingly, under such conditions a maximum volume of oil is fed to the cylinder 21 in one or the other direction.

Control of the solenoid 82 is effected by a pair of micro-switch structures mounted upon the member 75.

Thus, for example, on each side of the slide 73, there are provided the T-slots 83 (Figs. 7 and 9). Adjustably mounted in these slots are the cams 84. The two cams, one on each side of the abutment 70, are thus associated with a specific angular position of the drum 11, so as to be active when the corresponding active abutment member 70 is active. Thus for each angular position of drum 11, one abutment 70, and a pair of cams 84 respectively on opposite sides of the abutment, are above the upper surface of member 75.

Cams 84 are each intended respectively to cooperate with micro-switches 85, 86. Micro-switch 85 is arranged to be operated during the downward travel of the head 2 just prior to the time that the tool 6 enages the work 7. In order to accomplish this, the cam 84 is quite carefully adjusted within the T-slot 83. As the cam 84 proceeds downwardly the micro-switch 85 is actuated, and the control circuits are arranged in such a way as to cause the by-pass port 95 to be out of registry with conduits 93, 94.

Ultimately, as hereinbefore stated, the abutment 70 engages the upper surface of the member 75 and causes reversal of the feed by energization of the solenoid 66. Until the cam 84 associated with micro-switch 86 passes the micro-switch 86, the rate of feed is that corresponding to the setting of the valve structure A. However, as soon as the tool 6 leaves the work 7, the micro-switch 86 is actuated in such a manner as to cause the control circuits to move the slide 81 to the open position shown in Fig. 10. The rate of rise of the head 2 is thus increased. The successive angular positions of drum 11 provides a successive pair of cams 84 that may be independently adjusted to provide fast travel at any level of the tool holder.

The control circuits are diagrammatically shown by the block 88 adapted to be supplied from a commercial source of energy by the aid of the mains 89.

The inventor claims:

1. In a hydraulic feed control system for machine tools adapted to operate on work: a head having a plurality of tool-holders; means for adjusting said head to select tool-holders in succession into active relation to the work; a hydraulic device for causing a feeding movement between the head and the work; means providing a plurality of separate passages independently adjustable as to effective area of flow for the hydraulic fluid, each passage corresponding to a respective tool-holder; and means responsive to the successive adjustment of said head for closing all of the passages except that one which corresponds to the active tool-holder.

2. In a hydraulic feed control system for machine tools adapted to operate on work: a head having a plurality of tool-holders; means for adjusting said head to select tool-holders in succession into active relation to the work; a hydraulic device for causing a feeding movement between the head and the work; means forming a plurality of hydraulic fluid passages, corresponding in number to the number of tool-holders; means for independently adjusting the effective areas of opening of said passages; each passage corresponding to the tool-holders, respectively; a plate having an opening adapted to register in succession with said passages; and means operated in accordance with the successive adjustment of the head for moving said plate to bring said opening into successive registration with the passages.

3. In a hydraulic feed control system for machine tools adapted to operate on work: a head having a plurality of tool-holders; means for adjusting said head to select tool-holders in succession into active relation to the work; a hydraulic device for causing a feeding movement between the head and the work; means forming a plurality of hydraulic fluid passages, corresponding in number to the number of tool-holders; means for independently adjusting the effective areas of opening of said passages; each passage corresponding to the tool-holders, respectively; a plate having an opening adapted to register in succession with said passages; means operated in accordance with the successive adjustment of the head for moving said plate to bring said opening into successive registration with the passages; valve means paralleling said opening; and means responsive to a definite point in the feeding movement for closing said valve means.

4. In a hydraulic feed control system for machine tools adapted to operate on work: a head having a plurality of tool-holders; means for adjusting said head to select tool-holders in succession into active relation to the work; a hydraulic device for causing a feeding movement between the head and the work; means forming a plurality of hydraulic fluid passages, corresponding in number to the number of tool-holders; means for independently adjusting the effective areas of opening of said passages; each passage corresponding to the tool-holders, respectively; a plate having an opening adapted to register in succession with said passages; means operated in accordance with the successive adjustment of the head for moving said plate to bring said opening into successive registration with the passages; said feeding movement having terminal travel corresponding to engagement, and then disengagement of the tool and work by retraversing said terminal travel in the reverse direction; valve means paralleling said opening; and means responsive to the beginning of the terminal travel for closing said valve means, and to the ending of terminal travel in the reverse direction for opening said valve means.

References Cited in the file of this patent

UNITED STATES PATENTS

| | | |
|---|---|---|
| 490,864 | Conradson | Jan. 31, 1893 |
| 918,918 | Rutan | Apr. 20, 1909 |
| 1,177,741 | Turner | Apr. 4, 1916 |
| 1,282,152 | Warren | Oct. 22, 1918 |
| 2,047,181 | Ferris | July 14, 1936 |
| 2,202,960 | Parker | June 4, 1940 |
| 2,324,727 | Shartle | July 20, 1943 |

FOREIGN PATENTS

| | | |
|---|---|---|
| 548,012 | Great Britain | Sept. 22, 1942 |